US012624949B2

(12) United States Patent
    Sakaide

(10) Patent No.: US 12,624,949 B2
(45) Date of Patent: May 12, 2026

(54) MANUFACTURING METHOD FOR ELECTRONIC DEVICE AND ELECTRONIC DEVICE

(71) Applicant: SEIKO EPSON CORPORATION, Tokyo (JP)

(72) Inventor: Takeru Sakaide, Minowa (JP)

(73) Assignee: SEIKO EPSON CORPORATION (JP)

( * ) Notice: Subject to any disclaimer, the term of this patent is extended or adjusted under 35 U.S.C. 154(b) by 314 days.

(21) Appl. No.: 18/506,494

(22) Filed: Nov. 10, 2023

(65) Prior Publication Data

US 2024/0159536 A1     May 16, 2024

(30) Foreign Application Priority Data

Nov. 11, 2022    (JP) ................................. 2022-180840

(51) Int. Cl.
    *G01C 19/5783*        (2012.01)
    *G01C 19/5769*        (2012.01)
    *G01D 11/24*          (2006.01)
    *G01P 1/02*           (2006.01)

(52) U.S. Cl.
    CPC ..... *G01C 19/5783* (2013.01); *G01C 19/5769* (2013.01); *G01D 11/245* (2013.01); *G01P 1/02* (2013.01)

(58) Field of Classification Search
    CPC ............ G01C 19/5733; G01C 19/5783; G01C 19/5769; G01P 1/02; G01P 3/00; G01P 21/02; G01D 11/24; G01D 11/245; H03H 9/05; H03H 3/04; H03H 9/10; H03H 9/19
    See application file for complete search history.

(56) References Cited

U.S. PATENT DOCUMENTS

| | | | | |
|---|---|---|---|---|
| 2009/0140612 A1* | 6/2009 | Ikeuchi | .................. | H04R 1/245 |
| | | | | 310/348 |
| 2011/0163398 A1* | 7/2011 | Laermer | ............... | G01L 9/0042 |
| | | | | 257/416 |
| 2022/0276149 A1* | 9/2022 | Kuyken | ............. | G01N 21/1702 |
| 2022/0286107 A1* | 9/2022 | Kitahara | ............. | H03H 9/1014 |

FOREIGN PATENT DOCUMENTS

| | | | | |
|---|---|---|---|---|
| JP | 2013-088337 A | 5/2013 | | |
| JP | 2019215269 A | * 12/2019 | ......... | G01C 19/5769 |

* cited by examiner

*Primary Examiner* — Benjamin R Schmitt
(74) *Attorney, Agent, or Firm* — Harness, Dickey & Pierce, P.L.C.

(57)                ABSTRACT

A manufacturing method for an electronic device includes a housing step of housing a vibrator element in a housing space formed by a substrate and a lid member, and an adjustment step of adjusting a resonance frequency of the lid member by removing a part of the lid member. The method further includes an inspection step of determining whether to perform the adjustment step. At the inspection step, performing the adjustment step is determined when the resonance frequency of the lid member is within a vibration frequency band of the vibrator element. At the adjustment step, a part of the lid member is removed by laser cutting.

6 Claims, 12 Drawing Sheets

MANUFACTURING METHOD FOR ELECTRONIC DEVICE AND ELECTRONIC DEVICE

The present application is based on, and claims priority from JP Application Serial Number 2022-180840, filed Nov. 11, 2022, the disclosure of which is hereby incorporated by reference herein in its entirety.

BACKGROUND

1. Technical Field

The present disclosure relates to a manufacturing method for an electronic device and an electronic device.

2. Related Art

A vibrating sensor device disclosed in JP-A-2013-088337 detects an angular velocity using a Coriolis force and includes a package having a recessed portion, a control circuit element mounted on a bottom surface of the recessed portion, a vibrating sensor element mounted on an upper surface of the control circuit element, and an upper lid covering the control circuit element and the vibrating sensor element and joined to the package. In the vibrating sensor device having the above described configuration, when the resonance frequency of the upper lid and the frequency of the vibrating sensor element are close to each other, the upper lid and the vibrating sensor element resonate and detection accuracy of the vibrating sensor device is degraded. Accordingly, in JP-A-2013-088337, the resonance frequency of the upper lid is adjusted by a stepped structure in the side surface of the upper lid.

However, in the vibrating sensor device in JP-A-2013-088337, the resonance frequency of the upper lid is adjusted by the shape thereof and it is difficult to adjust the resonance frequency of the upper lid after assembly of the vibrating sensor device. Accordingly, there is a problem that it is difficult to address manufacturing variations.

SUMMARY

A manufacturing method for an electronic device according to an aspect of the present disclosure includes a housing step of housing a vibrator element in a housing space formed by a substrate and a lid member, and an adjustment step of adjusting a resonance frequency of the lid member by removing a part of the lid member.

An electronic device according to an aspect of the present disclosure includes a substrate, an electronic component mounted on the substrate and including a vibrator element, and a lid member mounted on the substrate and covering the electronic component, wherein the lid member has a frequency adjustment mark formed by removal of a part thereof and being thinner than a surrounding portion.

BRIEF DESCRIPTION OF THE DRAWINGS

Figure 1:
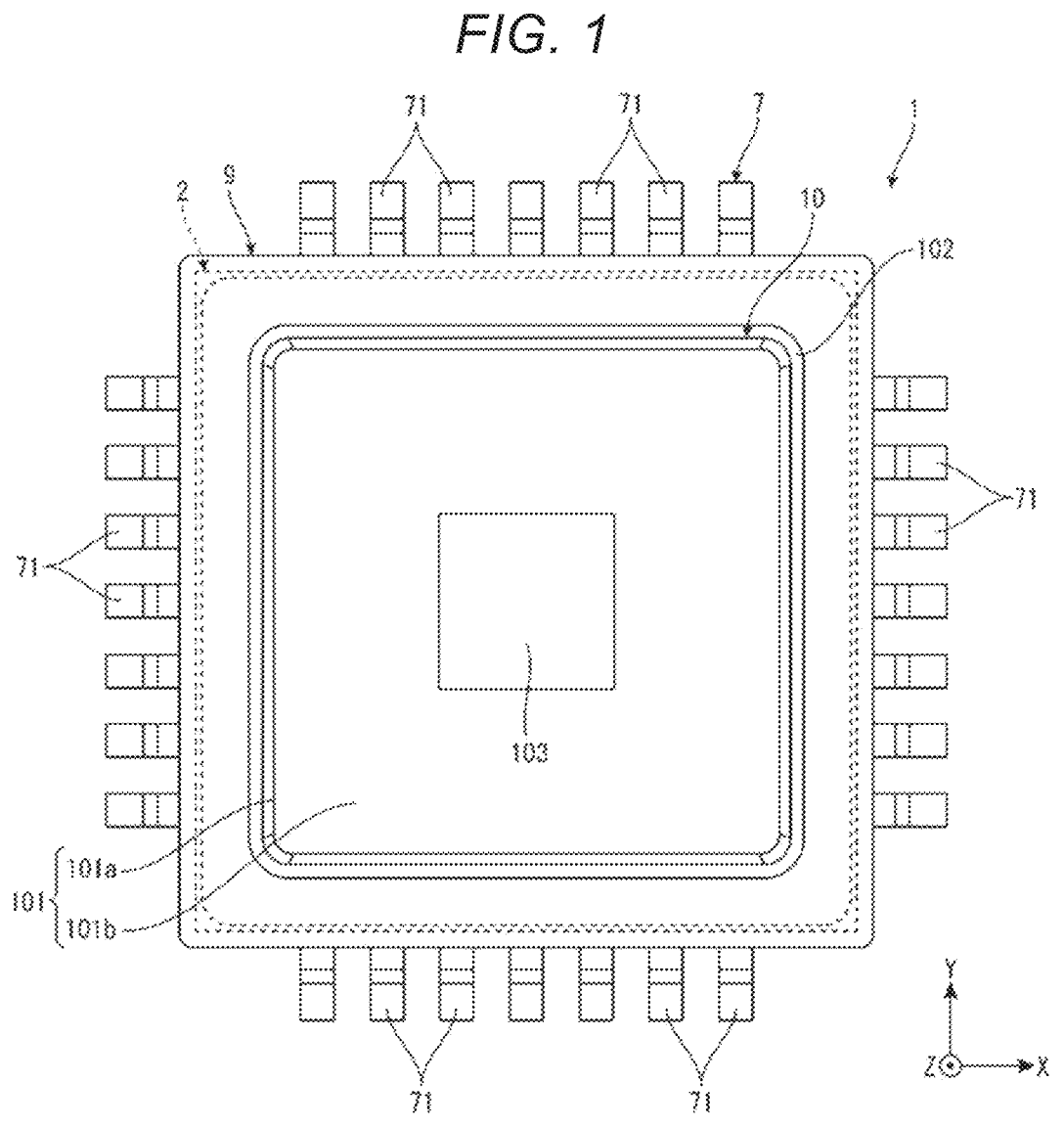

FIG. 1 is a top view showing an electronic device according to a first embodiment.

Figure 13:
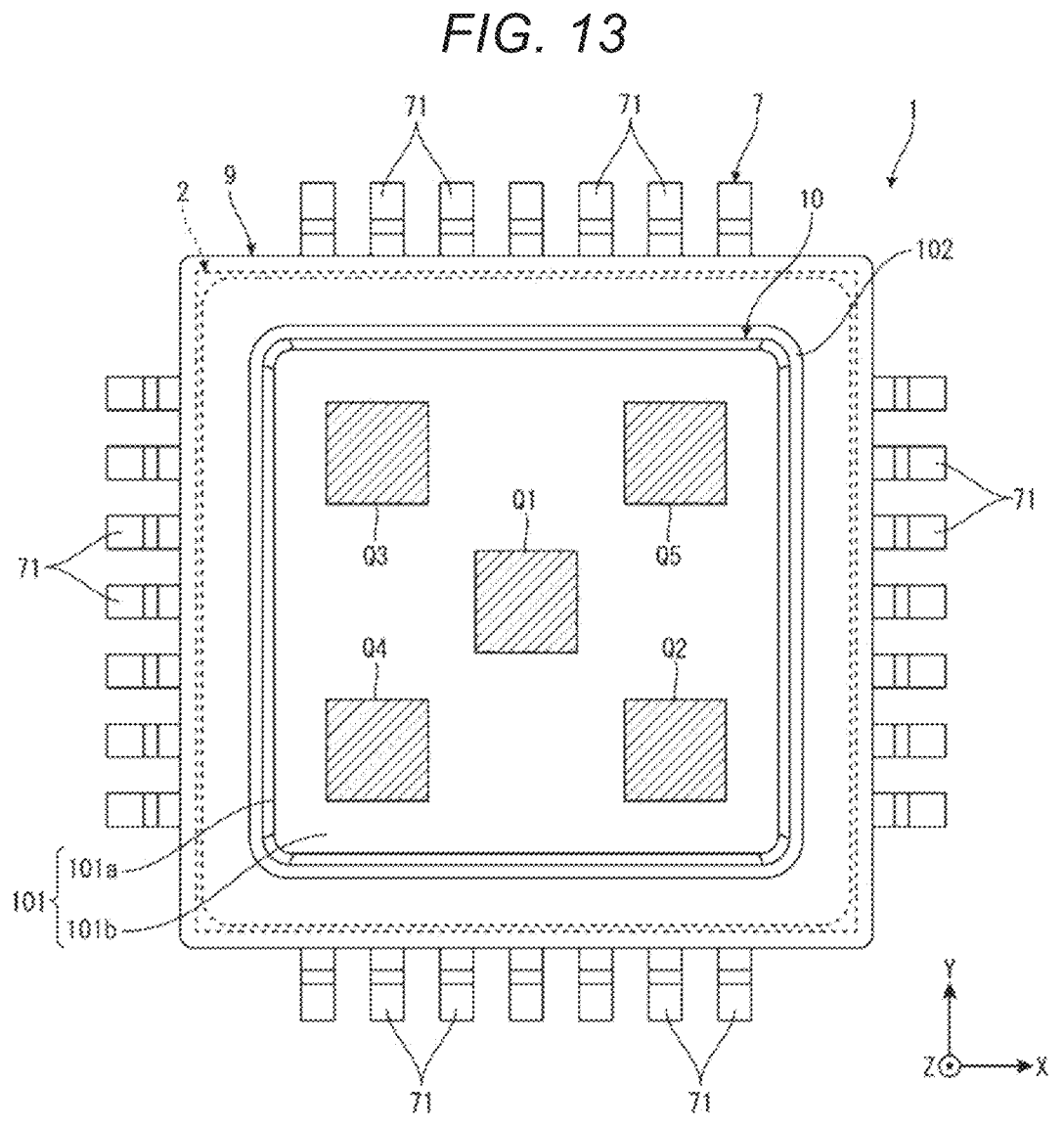

FIG. 13 is a top view showing an example of a method of removing a part of a cap.

DESCRIPTION OF EMBODIMENTS

As below, an electronic device of the present disclosure will be explained in detail based on embodiments shown in the accompanying drawings. Note that, for convenience of explanation, in the respective drawings except FIGS. 4 to 6, three axes orthogonal to one another are shown as an X-axis, a Y-axis, and a Z-axis. Directions parallel to the X-axis are also referred to as "X-axis directions", directions parallel to the Y-axis are also referred to as "Y-axis directions", and directions parallel to the Z-axis are also referred to as "Z-axis directions". Further, the Z-axis extends along a vertical direction and the pointer side is also referred to as "upper" and the opposite side is also referred to as "lower". Furthermore, in FIGS. 4 to 6, three axes orthogonal to one another are shown as an A-axis, a B-axis, and a C-axis. Directions parallel to the A-axis are also referred to as "A-axis directions", directions parallel to the B-axis are also referred to as "B-axis directions", and directions parallel to the C-axis are also referred to as "C-axis directions". Note that the X, Y, Z coordinate system is set for an electronic device and the A, B, C coordinate system is set for an angular velocity sensor.

First Embodiment

Figure 2:
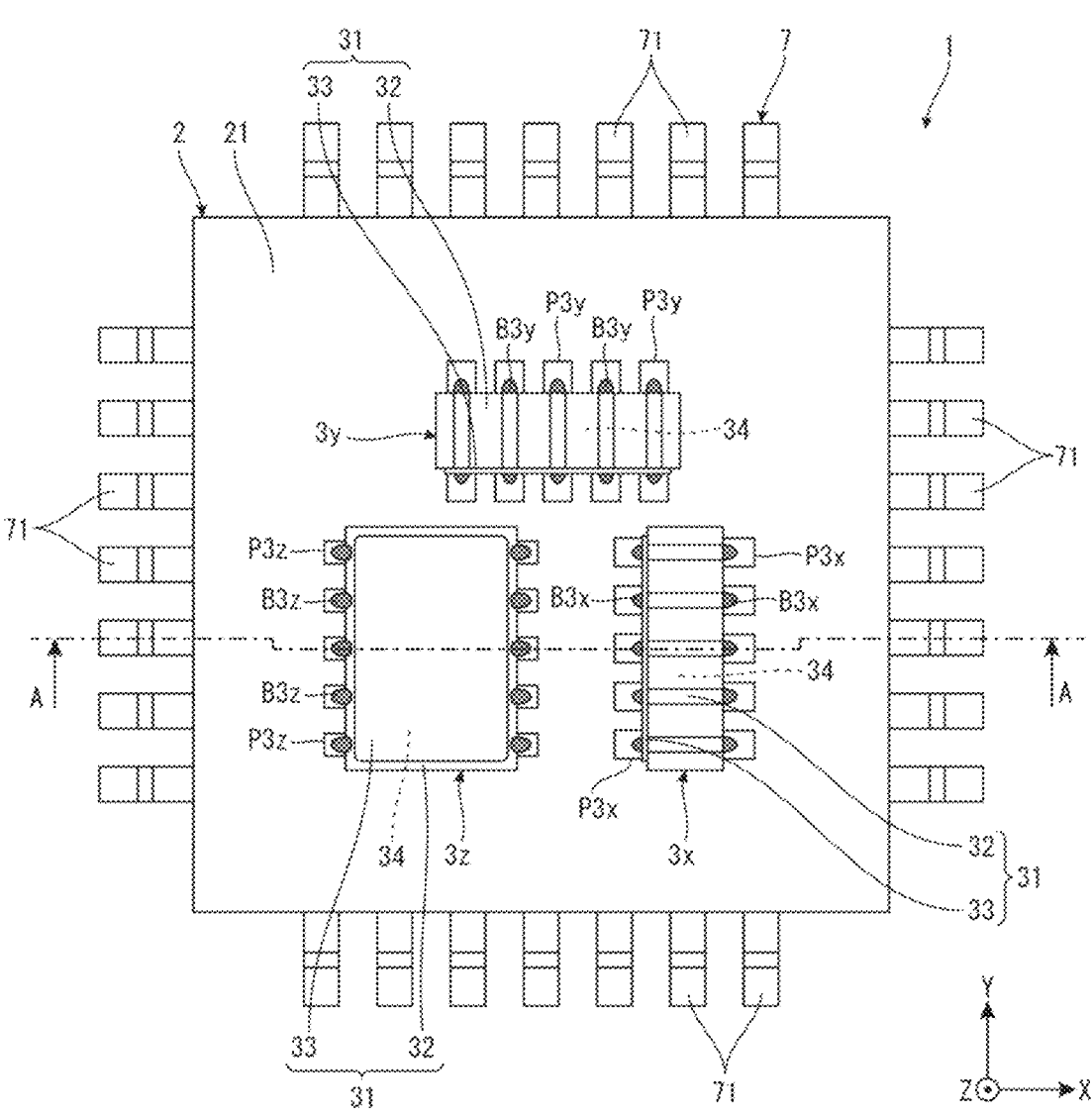
FIG. 2 is a top view of the electronic device in FIG. 1 from which a lid member and a mold portion are omitted.
Figure 3:
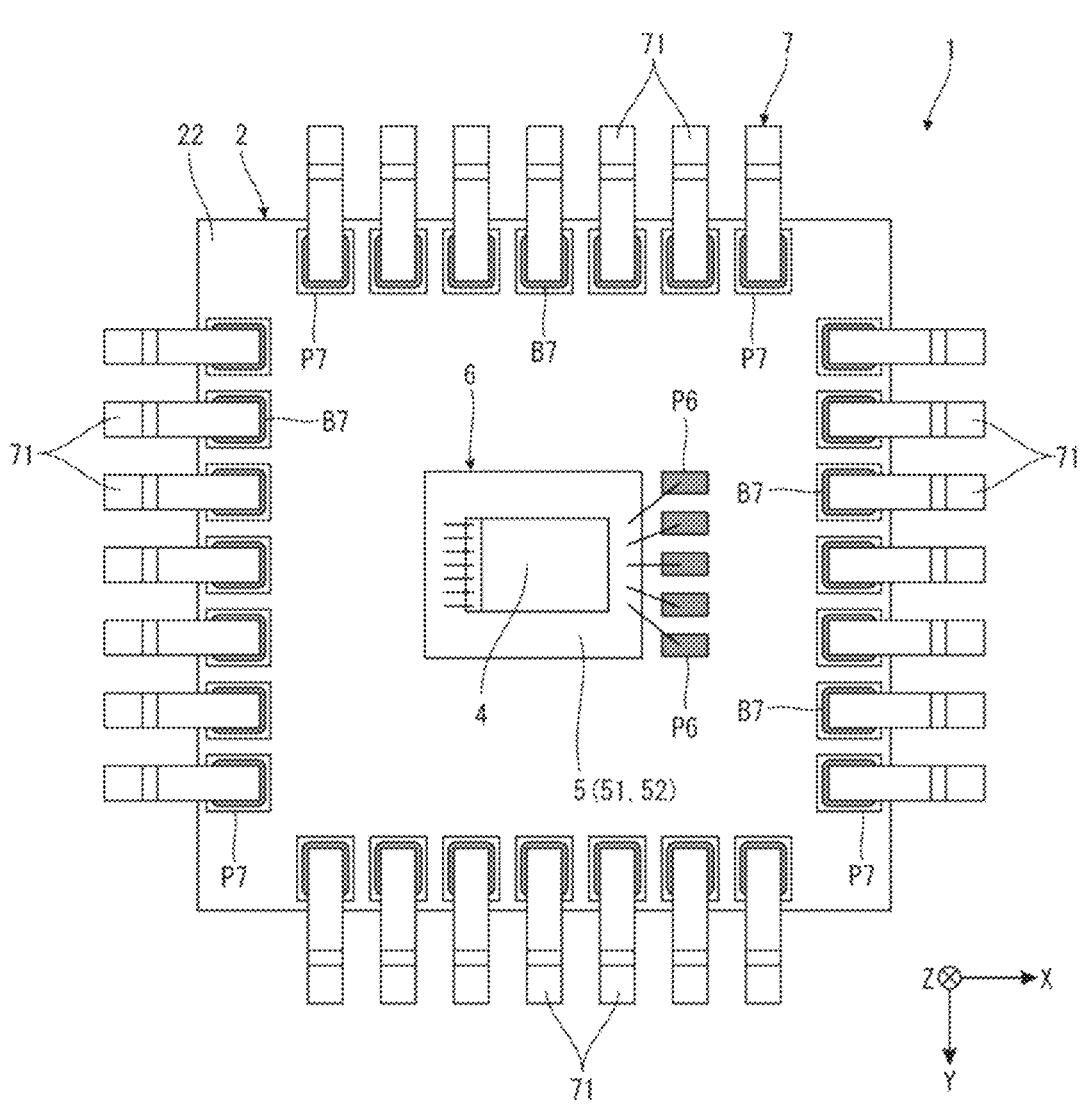
FIG. 3 is a bottom view of the electronic device in FIG. 1.
Figure 4:
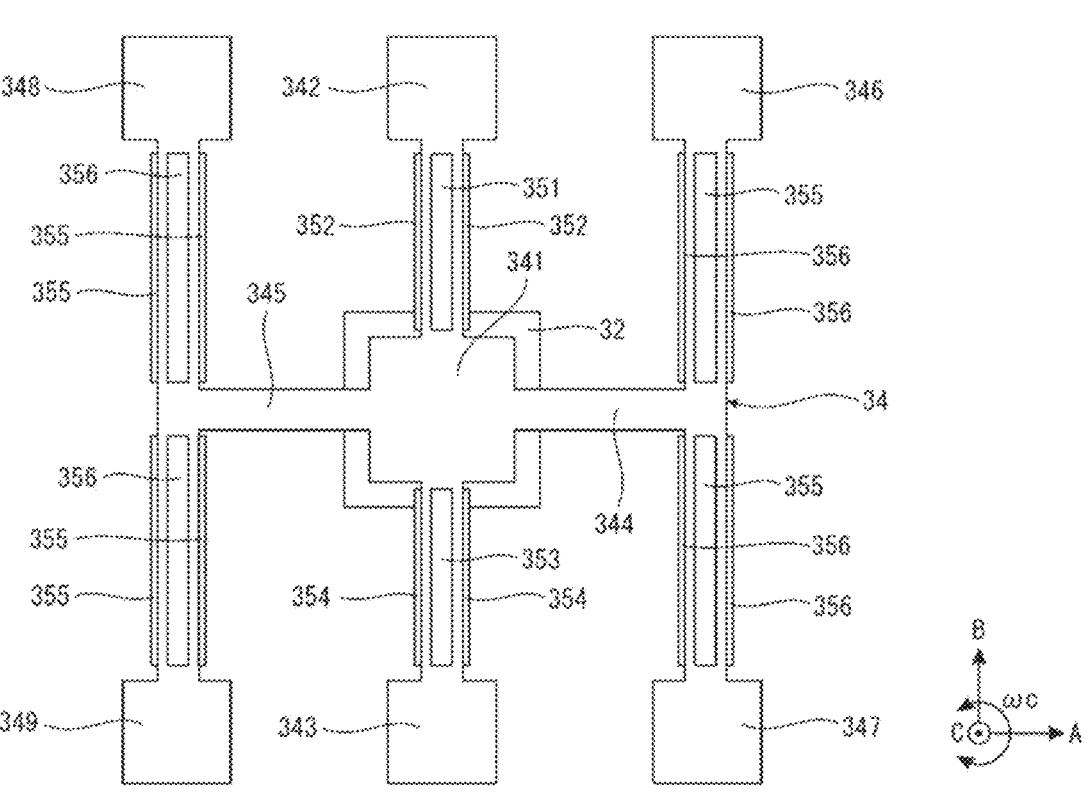
FIG. 4 is a plan view showing a vibrator element.
Figure 5:
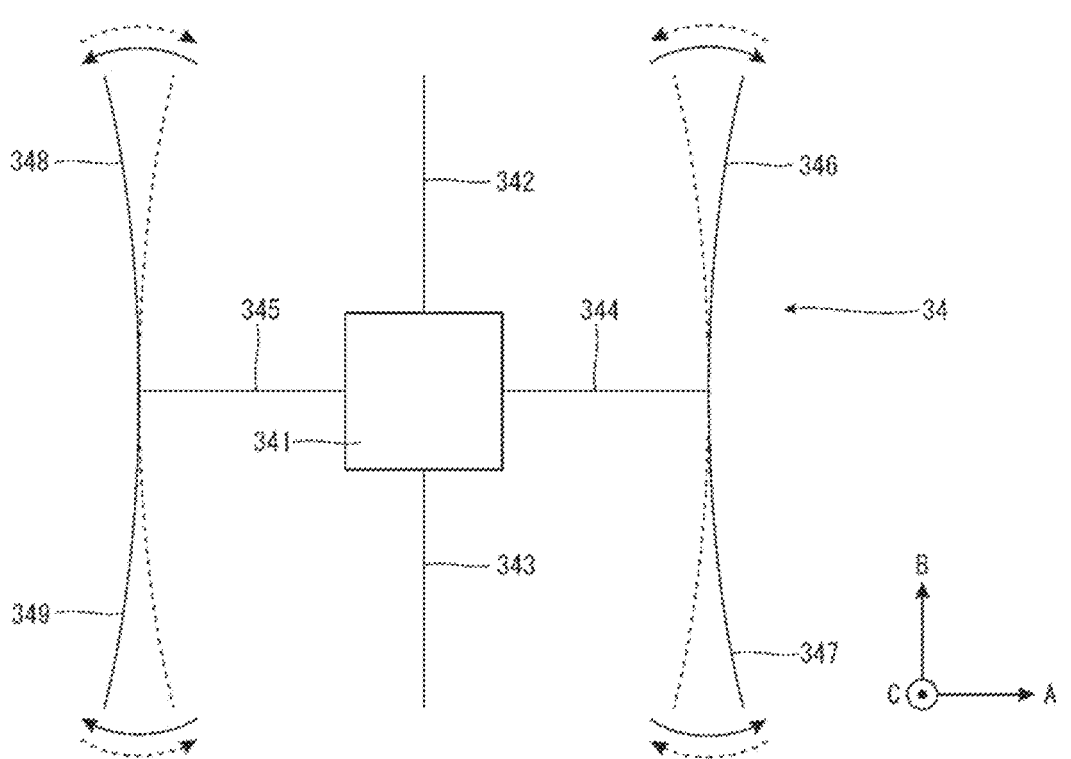
FIG. 5 is a diagram showing a drive state of the vibrator element.
Figure 6:
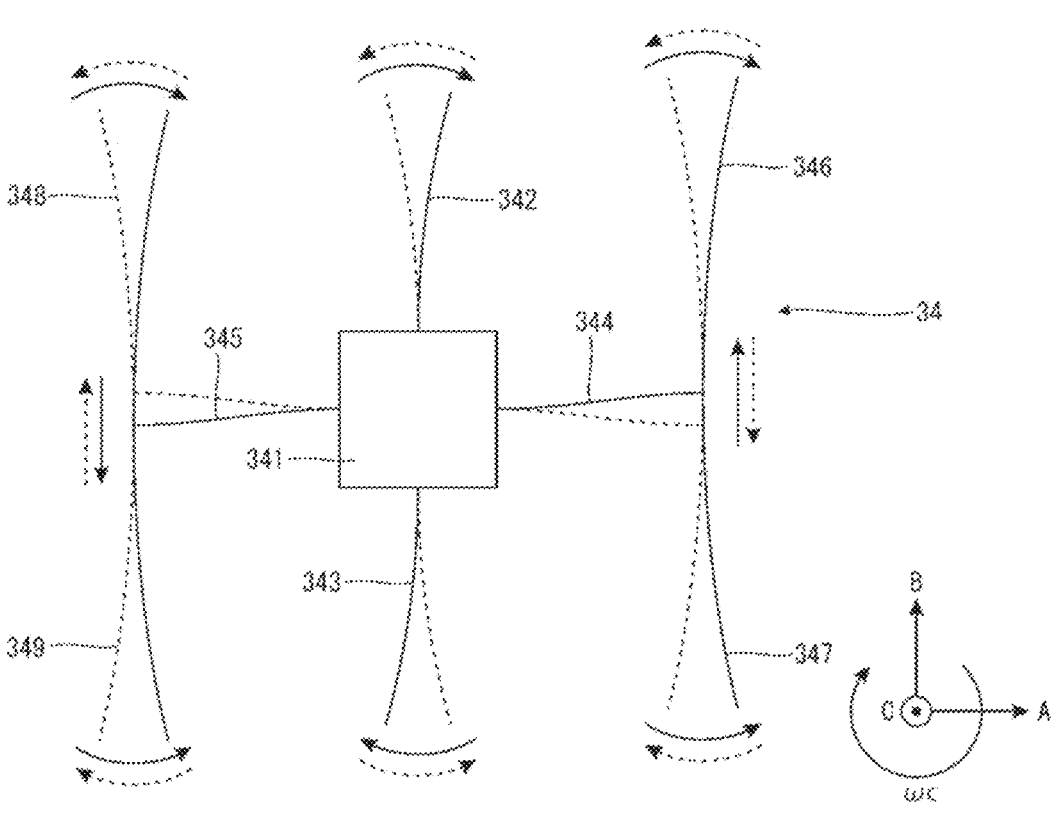
FIG. 6 is a diagram showing a drive state of the vibrator element.
Figure 7:
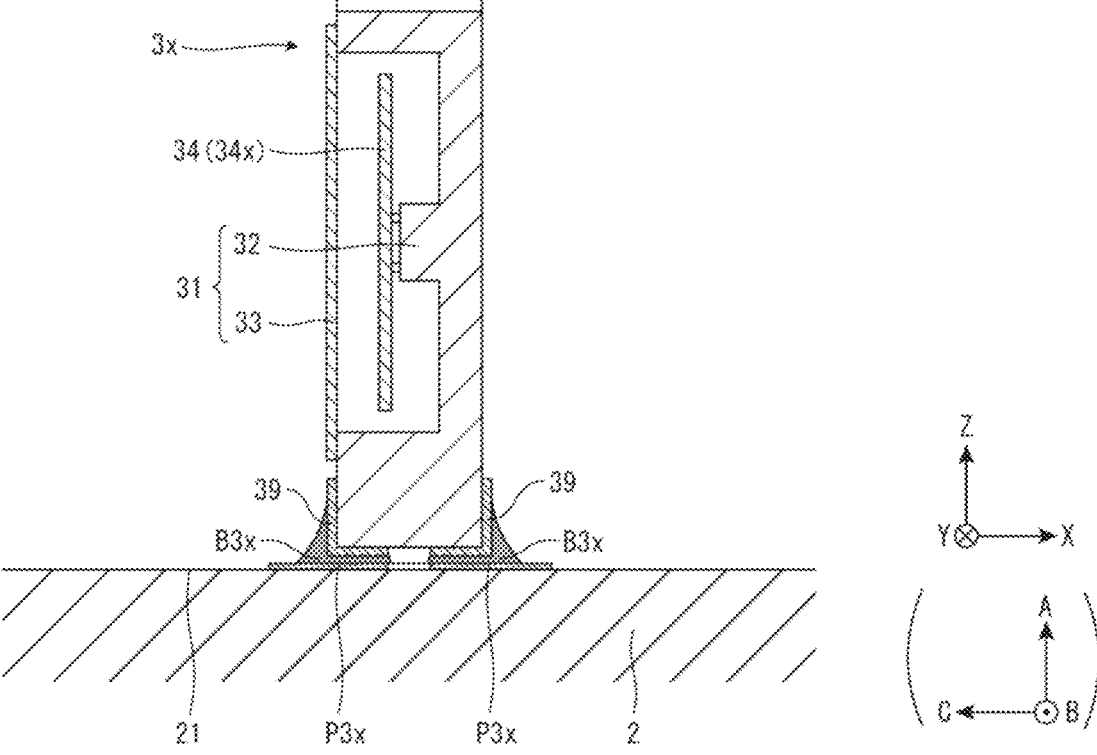
FIG. 7 is a sectional view of an angular velocity sensor.
Figure 8:
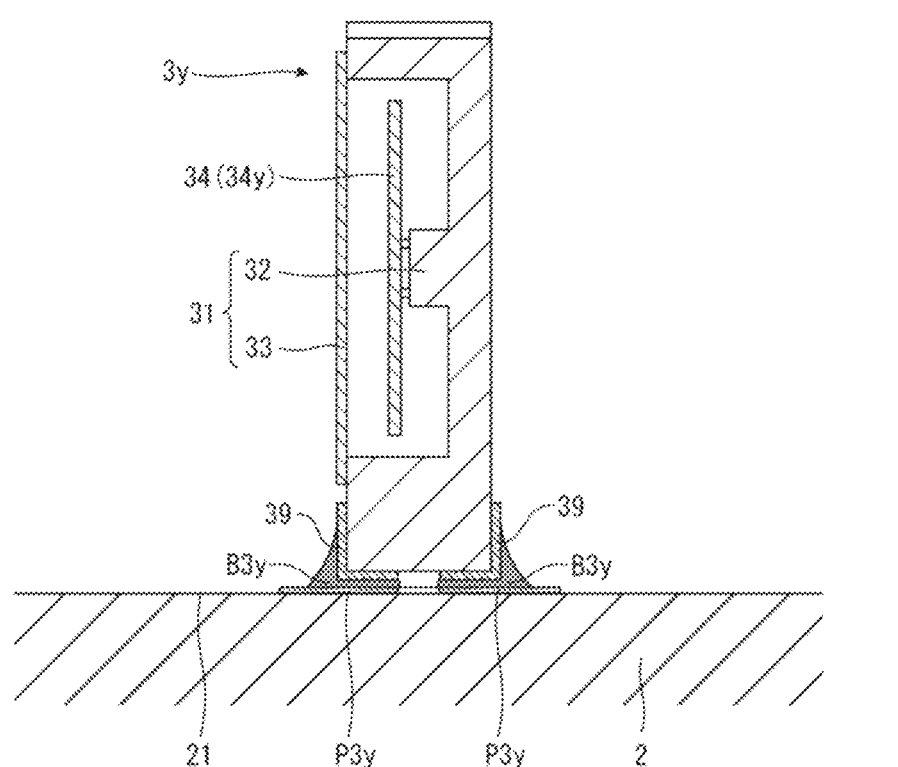
FIG. 8 is a sectional view of the angular velocity sensor.
Figure 9:
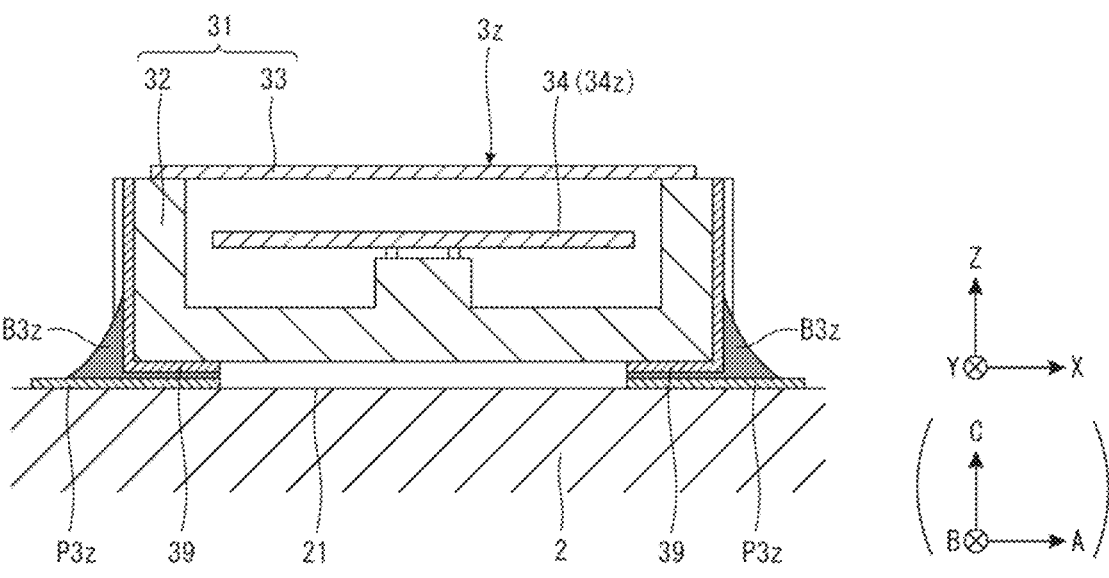
FIG. 9 is a sectional view of the angular velocity sensor.
Figure 10:
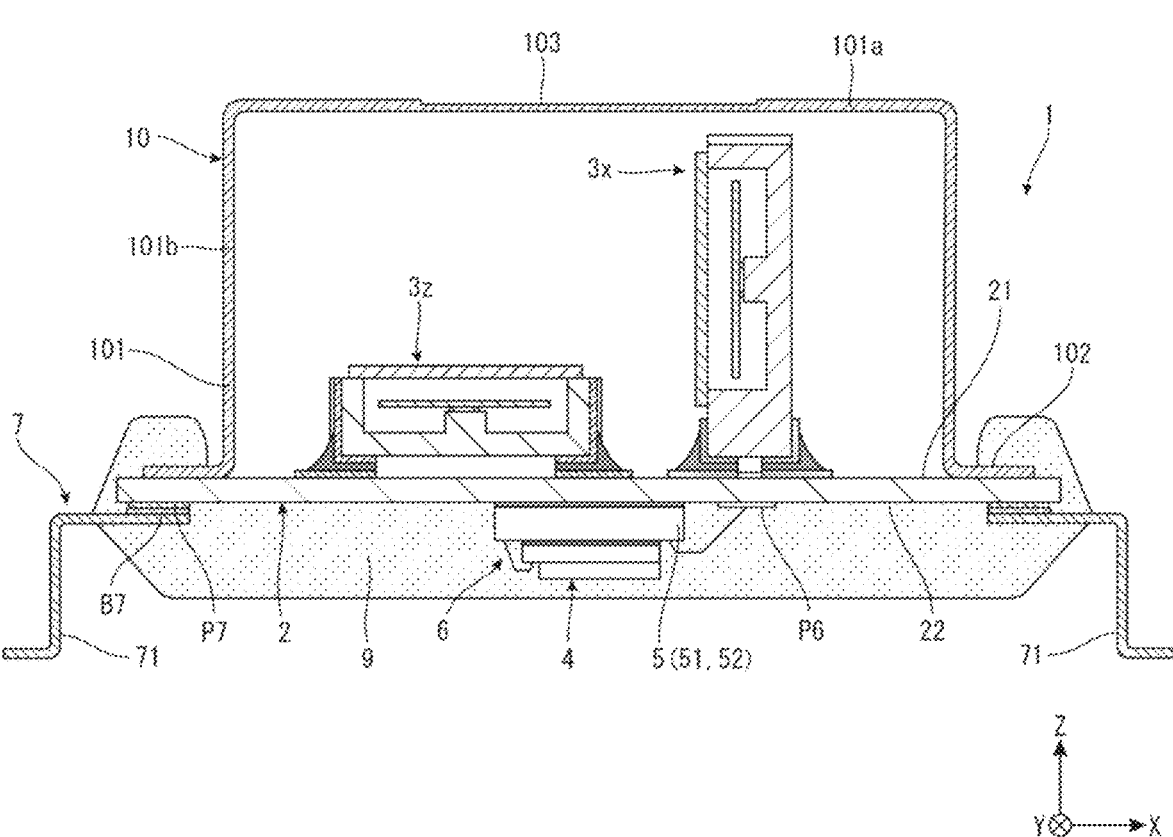
FIG. 10 is a sectional view along line A-A in FIG. 2.
Figure 11:
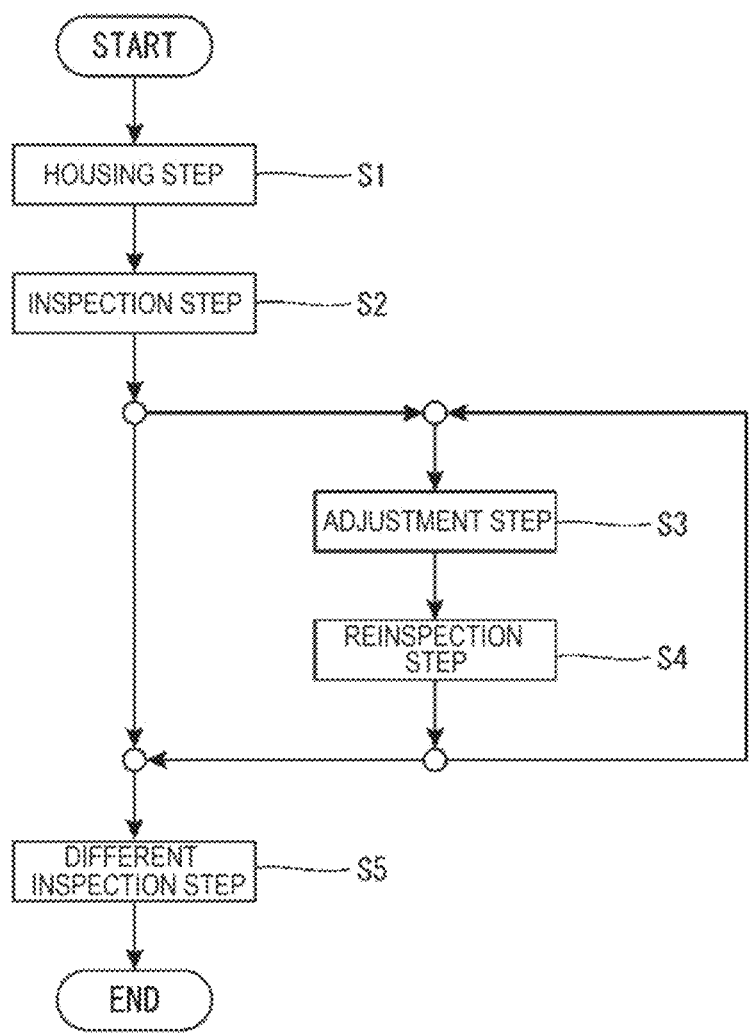
FIG. 11 is a flowchart showing a manufacturing method for the electronic device.
Figure 12:
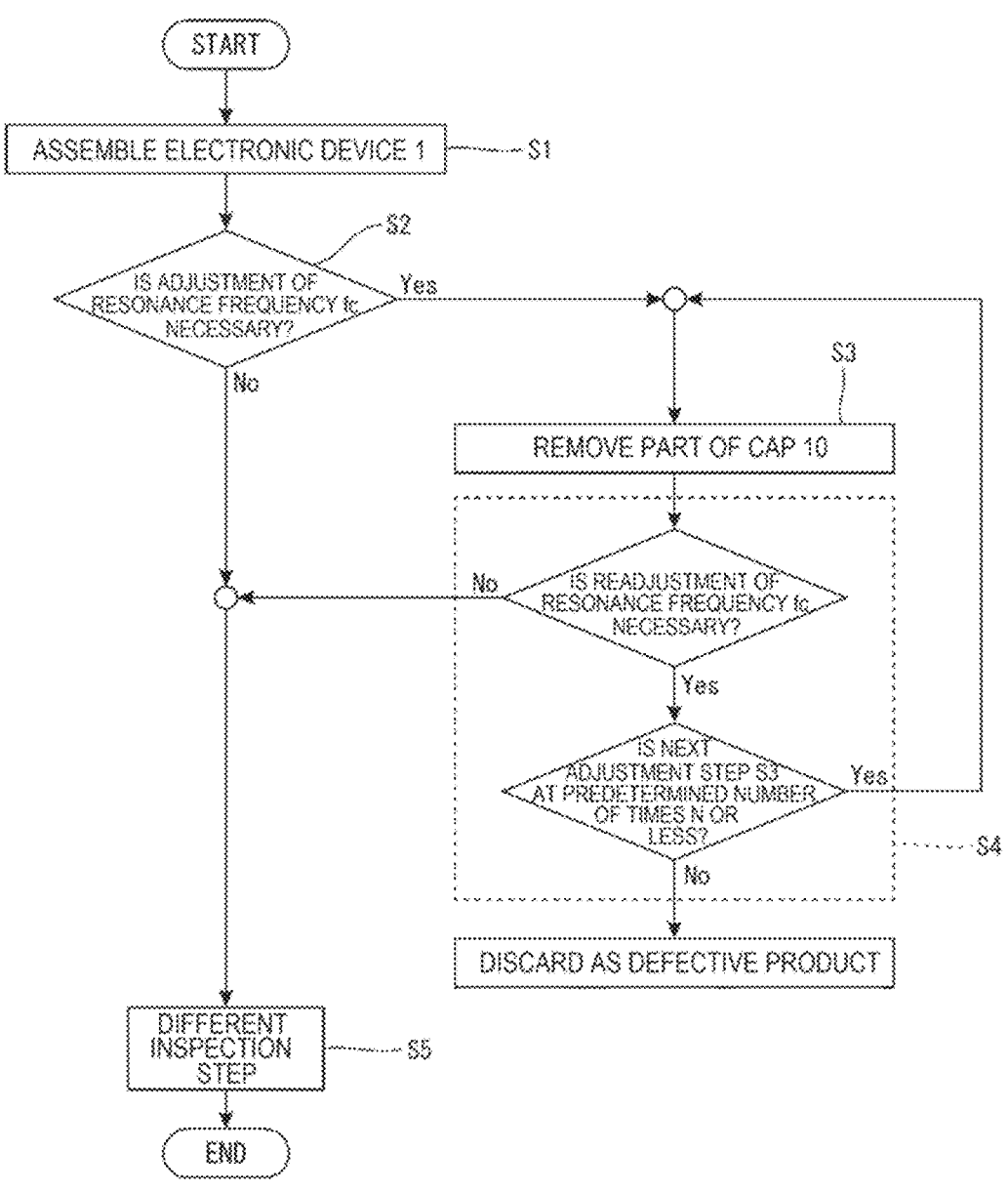
FIG. 12 is a flowchart showing the manufacturing method for the electronic device.
Figure 14:
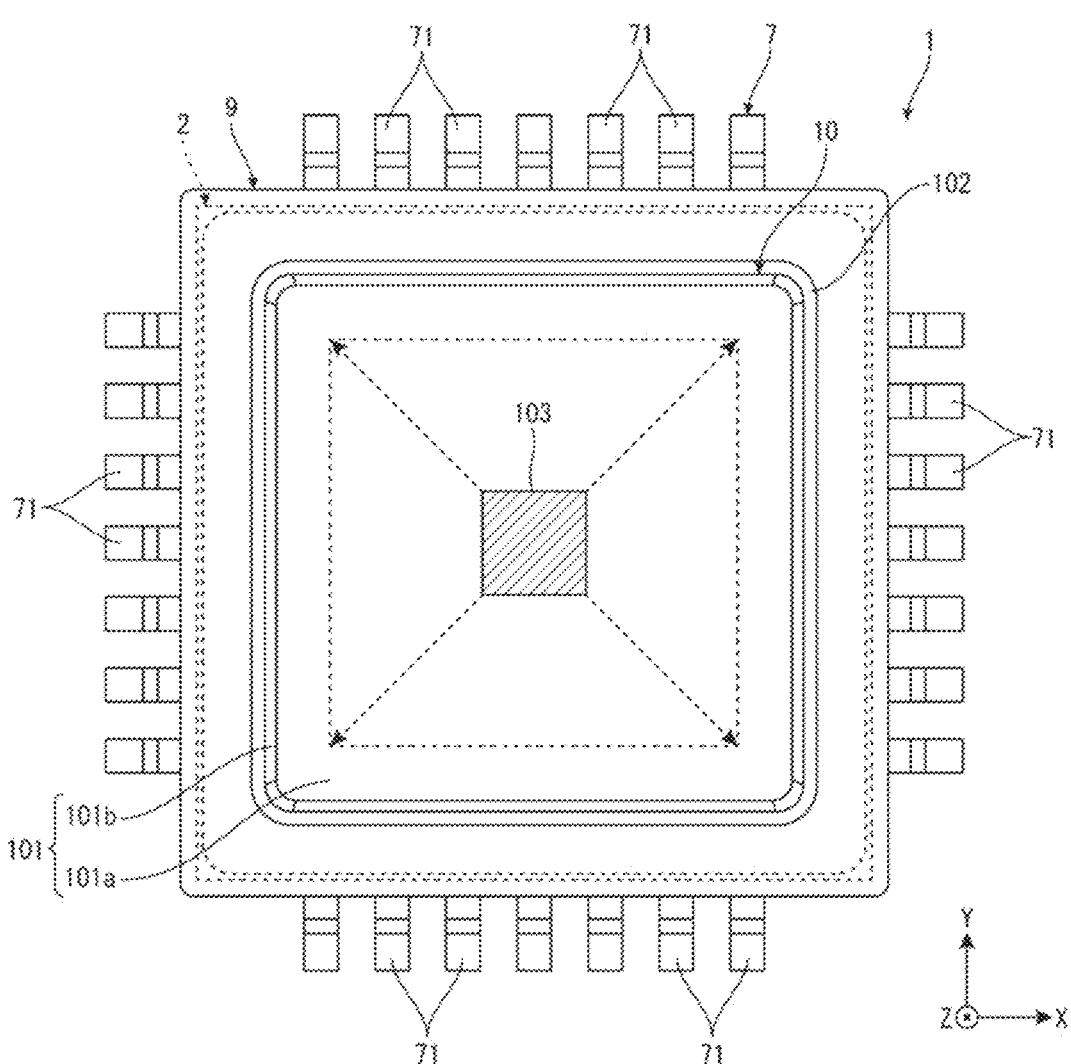
FIG. 14 is a top view showing the example of the method of removing the part of the cap.
Figure 15:
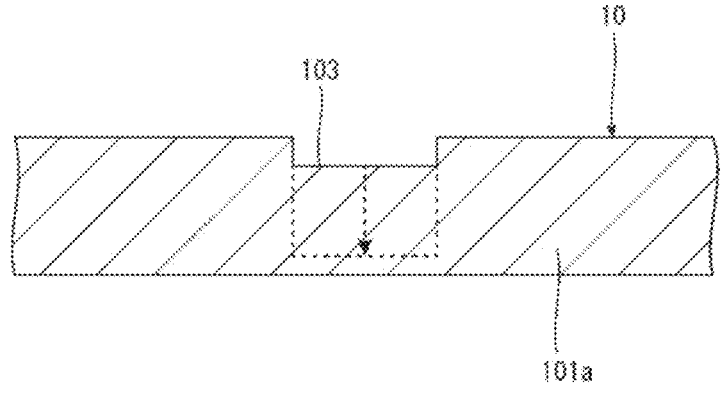
FIG. 15 is a sectional view showing the example of the method of removing the part of the cap.
Figure 15:
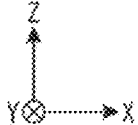

FIG. 1 is a top view showing an electronic device according to a first embodiment. FIG. 2 is a top view of the electronic device in FIG. 1 from which a lid member and a mold portion are omitted. FIG. 3 is a bottom view of the electronic device in FIG. 1. FIG. 4 is a plan view showing a vibrator element. FIGS. 5 and 6 are diagrams showing drive states of the vibrator element. FIGS. 7 to 9 are respectively sectional views of angular velocity sensors. FIG. 10 is a sectional view along line A-A in FIG. 2. FIGS. 11 and 12 are flowcharts showing a manufacturing method for the electronic device. FIGS. 13 and 14 are respectively top views showing an example of a method of removing a part of a cap. FIG. 15 is a sectional view showing the example of the method of removing the part of the cap.

An electronic device 1 shown in FIGS. 1 to 3 has a QFP (Quad Flat Package) structure. Further, the electronic device 1 includes a substrate 2, three angular velocity sensors 3x, 3y, 3z mounted on an upper surface 21 of the substrate 2, a cap 10 as a lid member placed on the substrate 2 to cover the three angular velocity sensors 3x, 3y, 3z, an electronic component 6 mounted on a lower surface 22 of the substrate 2, a lead group 7 extending from the substrate 2, and a mold portion 9 mold-sealing the electronic component 6 and joining the cap 10 to the substrate 2.

Substrate 2

The substrate 2 has a nearly square plate shape in a plan view and has the upper surface 21 and the lower surface 22 having a front-back relation with each other. The substrate 2 is a ceramic substrate and formed using various ceramic materials such as alumina and titania. Thereby, the substrate 2 having a higher corrosion resistance and a higher mechanical strength is obtained. Further, the substrate has a resistance to moisture absorption and a higher heat resistance and, for example, is hard to be damaged by heat applied in the manufacture of the electronic device 1. Note that the substrate 2 is not limited to the ceramic substrate, but e.g., various semiconductor substrates, various glass substrates, various printed boards, etc. may be used.

As shown in FIG. 2, on the upper surface 21, terminals P3*x* electrically coupled to the angular velocity sensor 3*x*, terminals P3*y* electrically coupled to the angular velocity sensor 3*y*, and terminals P3*z* electrically coupled to the angular velocity sensor 3*z* are formed. On the other hand, as shown in FIG. 3, on the lower surface 22, terminals P6 electrically coupled to the electronic component 6 and terminals P7 electrically coupled to the lead group 7 are formed. These respective terminals P3*x*, P3*y*, P3*z*, P6, P7 are electrically coupled via wires (not shown) formed at the substrate 2.

Angular Velocity Sensors 3*x*, 3*y*, 3*z*

As shown in FIG. 2, the angular velocity sensors 3*x*, 3*y*, 3*z* are respectively mounted on the upper surface 21 of the substrate 2. Further, the angular velocity sensors 3*x*, 3*y*, 3*z* are respectively packaged surface-mounted components. Thereby, a higher mechanical strength than mounted components with exposed elements can be exerted. Further, mounting of the angular velocity sensors 3*x*, 3*y*, 3*z* on the substrate 2 is easier.

The angular velocity sensor 3*x* detects an angular velocity around the X-axis, the angular velocity sensor 3*y* detects an angular velocity around the Y-axis, and the angular velocity sensor 3*z* detects an angular velocity around the Z-axis. These angular velocity sensors 3*x*, 3*y*, 3*z* have the same basic configuration and are placed so that attitudes may be orthogonal to one another with detection axes directed along the X-axis, the Y-axis, and the Z-axis, respectively.

Each of the angular velocity sensors 3*x*, 3*y*, 3*z* has a package 31 and the vibrator element 34 housed in the package 31. The package 31 has a recessed portion and includes a box-shaped base 32 supporting the vibrator element 34 housed in the recessed portion, and a lid 33 joined to the base 32 to close the opening of the recessed portion. On the base 32, coupling terminals 39 electrically coupled to the vibrator element 34 are formed. The base 32 is formed using a ceramic material such as alumina or titania and the lid 33 is formed using a metal material such as kovar. Thereby, a difference in coefficient of linear expansion between the base 32 and the lid 33 is smaller and generation of thermal stress can be effectively suppressed.

For example, the vibrator element 34 is a quartz crystal vibrator element having a drive arm and a vibrating arm. In the quartz crystal vibrator element, when an angular velocity around a detection axis is applied while a drive signal is applied and the drive arm is driven and vibrated, a detection vibration is excited in a detection arm by a Coriolis force. Then, electric charge generated in the detection arm by the detection vibration is extracted as a detection signal and the angular velocity can be obtained based on the extracted detection signal.

The configuration of the vibrator element 34 is not particularly limited, but the vibrator element 34 of the embodiment has the configuration shown in FIG. 4. Note that, in FIG. 4, the A-axis, the B-axis, and the C-axis as the three axes orthogonal to one another are shown. The vibrator element 34 includes a base portion 341 located in the center part, a pair of detection vibration arms 342, 343 extending from the base portion 341 toward both sides in the B-axis direction, a pair of supporting arms 344, 345 extending from the base portion 341 toward both sides in the A-axis direction, a pair of drive vibration arms 346, 347 extending from an end of one supporting arm 344 toward both sides in the B-axis direction, and a pair of drive vibration arms 348, 349 extending from an end of the other supporting arm 345 toward both sides in the B-axis direction. The vibrator element 34 is supported by the base 32 in the base portion 341.

Further, the vibrator element 34 includes first detection signal electrodes 351 placed on both principal surfaces of the detection vibration arm 342, first detection ground electrodes 352 placed on both side surfaces of the detection vibration arm 342, second detection signal electrodes 353 placed on both principal surfaces of the detection vibration arm 343, second detection ground electrodes 354 placed on both side surfaces of the detection vibration arm 343, drive signal electrodes 355 placed on both principal surfaces of the drive vibration arms 346, 347 and both side surfaces of the drive vibration arms 348, 349, and drive ground electrodes 356 placed on both side surfaces of the drive vibration arms 346, 347 and both principal surfaces of the drive vibration arms 348, 349.

When drive signals are applied between the drive signal electrodes 355 and the drive ground electrodes 356, as shown in FIG. 5, the drive vibration arms 346, 347 and the drive vibration arms 348, 349 flexurally vibrate oppositely in phase in the A-axis directions along the AB-plane (hereinafter, this state is also referred to as "drive vibration mode"). In the state, the vibrations of the drive vibration arms 346, 347, 348, 349 are cancelled out and the detection vibration arms 342, 343 do not substantially vibrate. When an angular velocity ωc around the C-axis is applied to the vibrator element 34 while driven in the drive vibration mode, as shown in FIG. 6, a Coriolis force acts on the drive vibration arms 346, 347, 348, 349 and flexural vibrations in the B-axis directions are excited and the detection vibration arms 342, 343 flexurally vibrate in the A-axis directions in response to the flexural vibrations (hereinafter, this state is also referred to as "detection vibration mode").

Electric charge generated in the detection vibration arm 342 by the flexural vibration is extracted as a first output signal from the first detection signal electrodes 351, electric charge generated in the detection vibration arm 343 is extracted as a second output signal from the second detection signal electrodes 353, and the angular velocity ωc is obtained based on these first, second output signals.

As above, the configurations of the angular velocity sensors 3*x*, 3*y*, 3*z* are explained. As shown in FIG. 7, the angular velocity sensor 3*x* is placed with the C-axis along the X-axis. Accordingly, the vibrator element 34 vibrates along a YZ-plane. Further, the angular velocity sensor 3*x* is joined to the upper surface 21 of the substrate 2 via a plurality of conductive joint members B3*x* on the side surface of the base 32. The respective coupling terminals 39 are electrically coupled to the predetermined terminals P3x via the joint members B3x.

As shown in FIG. 8, the angular velocity sensor 3y is placed with the C-axis along the Y-axis. Accordingly, the vibrator element 34 vibrates along an XZ-plane. Further, the angular velocity sensor 3y is joined to the upper surface 21 of the substrate 2 via a plurality of conductive joint members B3y on the side surface of the base 32. The respective coupling terminals 39 are electrically coupled to the predetermined terminals P3y via the joint members B3y.

As shown in FIG. 9, the angular velocity sensor 3z is placed with the C-axis along the Z-axis. Accordingly, the vibrator element 34 vibrates along an XY-plane. Further, the angular velocity sensor 3z is joined to the upper surface 21 of the substrate 2 via a plurality of conductive joint members B3z on the bottom surface of the base 32. The respective coupling terminals 39 are electrically coupled to the predetermined terminals P3z via the joint members B3z.

Hereinafter, the vibrator element 34 of the angular velocity sensor 3x is also referred to as "vibrator element 34x", the vibrator element 34 of the angular velocity sensor 3y is also referred to as "vibrator element 34y", and the vibrator element 34 of the angular velocity sensor 3z is also referred to as "vibrator element 34z". In the electronic device 1, a vibration frequency fx of the vibrator element 34x in the drive vibration mode, a vibration frequency fy of the vibrator element 34y in the drive vibration mode, and a vibration frequency fz of the vibrator element 34z in the drive vibration mode are different from one another. That is, $fx \neq fy \neq fz$. Thereby, interferences (resonances) among the vibrator elements 34x, 34y, 34z are suppressed and lowering of angular velocity detection characteristics can be effectively suppressed.

As described above, in the embodiment, the electronic device 1 has the three vibrator elements 34x, 34y, 34z as the vibrator elements 34, however, may have at least one vibrator element 34. Accordingly, for example, one or two of the angular velocity sensors 3x, 3y, 3z may be omitted.

Cap 10

As shown in FIG. 10, the cap 10 is joined to the upper surface 21 of the substrate 2 and covers the angular velocity sensors 3x, 3y, 3z. The cap 10 has a hat shape and includes a base portion 101 having a recessed part opening to the lower surface and an annular flange portion 102 projecting from the lower end part of the base portion 101 toward the outer circumference. The cap 10 is placed on the upper surface 21 of the substrate 2 to house the angular velocity sensors 3x, 3y, 3z in the recessed part. The flange portion 102 is joined to the substrate 2 by the mold portion 9. The cap 10 housing the angular velocity sensors 3x, 3y, 3z is provided, and thereby, the angular velocity sensors 3x, 3y, 3z can be protected from moisture, dust, impact, etc. Note that the interior of the cap 10 is atmospherically sealed, however, not limited to that. For example, the cap may be negative pressure-sealed or positive pressure-sealed, or the air may be replaced by a stable gas such as nitrogen or argon. Or, the cap 10 is not necessarily air-tightly sealed.

Further, the cap 10 has conductivity and is formed using e.g., a metal material. Particularly, in the embodiment, the cap may be formed using Alloy 42 as an iron-nickel alloy. Thereby, a difference in coefficient of linear expansion between the substrate 2 as the ceramic substrate and the cap 10 may be made sufficiently small, and thermal stress due to the difference in coefficient of linear expansion can be effectively suppressed. Therefore, the electronic device 1 having stable characteristics less susceptible to the environment temperature is obtained.

Furthermore, the cap 10 is coupled to the ground (GND) when the electronic device 1 is used. Thereby, the cap 10 functions as a shield shielding external electromagnetic noise and driving of the angular velocity sensors 3x, 3y, 3z housed in the cap 10 is stabilized. Note that the constituent material of the cap 10 is not limited to the alloy 42, but, e.g., a metal material such as an SUS material, various ceramic materials, various resin materials, semiconductor materials such as silicon, various glass materials, etc. may be used.

When the cap 10 resonates with the vibrator elements 34x, 34y, 34z, unnecessary vibrations may be generated in the vibrator elements 34x, 34y, 34z, zero-point outputs from the angular velocity sensors 3x, 3y, 3z may fluctuate, and the detection accuracy of the electronic device 1 may be lower. Note that "zero-point outputs" refer to outputs from the angular velocity sensors 3x, 3y, 3z in a rest state without an angular velocity.

Accordingly, in the electronic device 1, after assembly of the electronic device 1, a part of the cap 10 is removed and the resonance frequency fc of the cap 10 is shifted toward the lower frequency side as necessary, and the resonance frequency is sufficiently apart from the vibration frequencies of the vibrator elements 34x, 34y, 34z. Thereby, resonances of the vibrator elements 34x, 34y, 34z and the cap 10 are suppressed, unnecessary vibrations are harder to be generated in the vibrator elements 34x, 34y, 34z, and fluctuations of the zero-point outputs are suppressed. Therefore, lowering of the detection accuracy of the electronic device 1 can be effectively suppressed.

Note that the resonance frequency fc of the cap 10 has a temperature dependency and fluctuates depending on the temperature. On the other hand, for the electronic device 1, an operation temperature range is set as a range in which the device holds expected functions and normally operates. Generally, the operation temperature range is written on a packaging box, in product specifications of a user manual of the electronic device 1, or the like. The operation temperature range is not particularly limited, but different depending on the configuration of the electronic device 1, e.g., from −40° C. to +85° C.

Accordingly, in the electronic device 1, the resonance frequency fc is sufficiently apart from the vibration frequencies fx, fy, fz in the entire of the operation temperature range. Thereby, temperature drifts of the zero-point outputs of the respective angular velocity sensors 3x, 3y, 3z, i.e., fluctuations of the zero-point outputs with temperature changes are suppressed, and excellent angular velocity detection characteristics can be exerted.

As shown in FIG. 10, in the cap 10, a frequency adjustment mark 103 by removal of a part thereof is formed. The frequency adjustment mark 103 is formed by removal of a part of the cap 10, and has a smaller thickness than a surrounding portion. In other words, when there is a part having a smaller thickness than a surrounding portion, the part can be estimated as the frequency adjustment mark 103.

The base portion 101 of the cap 10 has a top part 101a in a plate shape and a side wall part 101b in a frame shape stood from the outer edge of the top part 101a, and the frequency adjustment mark 103 is formed in the top part 101a. The frequency adjustment mark 103 is formed in the top part 101a, and thereby, work to remove a part of the cap 10 can be performed from above the cap 10 and the work is easier. However, for example, the frequency adjustment mark 103 may be formed in the side wall part 101b. Note that the work to remove a part of the cap 10 will be explained in detail in a manufacturing method for the electronic device 1, which will be described later.

Electronic Component 6

As shown in FIGS. 3 and 10, the electronic component 6 is mounted on the lower surface 22 of the substrate 2. The electronic component 6 is a packaged surface-mounted component. Thereby, a higher mechanical strength than mounted components with exposed elements can be exerted. Further, mounting of the electronic component 6 on the substrate 2 is easier.

The electronic component 6 has a circuit element 5 joined to the lower surface of the substrate 2 and an acceleration sensor 4 joined onto the circuit element 5. Further, the circuit element 5 is electrically coupled to the terminals P6 via bonding wires and the acceleration sensor 4 is electrically coupled to the circuit element 5 via bonding wires.

The acceleration sensor 4 is a three-axis acceleration sensor that may respectively independently detect an acceleration in the X-axis directions, an acceleration in the Y-axis directions, and an acceleration in the Z-axis directions. The circuit element 5 is electrically coupled to the angular velocity sensors 3x, 3y, 3z, the acceleration sensor 4, and the lead group 7. The circuit element 5 has a control circuit 51 for controlling driving of the angular velocity sensors 3x, 3y, 3z and the acceleration sensor 4 and an interface circuit 52 for external communication.

The control circuit 51 independently controls driving of the angular velocity sensors 3x, 3y, 3z and the acceleration sensor 4 and independently detects the angular velocities around the respective axes of the X-axis, the Y-axis, and the Z-axis and accelerations in the respective axial directions based on the detection signals output from the angular velocity sensors 3x, 3y, 3z and the acceleration sensor 4. The interface circuit 52 transmits and receives signals, receives commands from an external apparatus, and outputs the detected angular velocities and accelerations to the external apparatus.

As above, the electronic component 6 is explained, however, the configuration of the electronic component 6 is not particularly limited. Or, the electronic component 6 may be omitted.

Lead Group 7

As shown in FIGS. 3 and 10, the lead group 7 is located at the lower surface 22 side of the substrate 2 and has a plurality of leads 71 joined to the lower surface 22 of the substrate 2 via conductive joint members B7. The plurality of leads 71 are provided substantially equally along the four sides of the substrate 2. Further, the plurality of leads 71 are electrically coupled to the terminals P7 via the joint members B7.

Mold Portion 9

As shown in FIG. 10, the mold portion 9 molds the electronic component 6 and protects the component from moisture, dust, impact, etc. Further, the mold portion 9 molds the coupling parts between the substrate 2 and the respective leads 71 and mechanically reinforces the parts and protects the parts from moisture, dust, impact, etc. Furthermore, the mold portion 9 joints the cap 10 and the substrate 2. A molding material forming the mold portion 9 is not particularly limited, but e.g., a curable resin material in addition to a thermosetting epoxy resin may be used. The mold portion 9 may be formed by e.g., transfer molding or the like.

As above, the configuration of the electronic device 1 is explained. As described above, the electronic device 1 includes the substrate 2, the angular velocity sensors 3x, 3y, 3z as electronic components mounted on the substrate 2 and having the vibrator elements 34x, 34y, 34z, and the cap 10 as the lid member mounted on the substrate and covering the angular velocity sensors 3x, 3y, 3z. Further, the cap 10 has the frequency adjustment mark 103 formed by removal of a part thereof and being thinner than the surrounding portion.

In the configuration, after assembly of the electronic device 1, a part of the cap 10 is removed and the resonance frequency fc of the cap 10 is shifted toward the lower frequency side as necessary, and the resonance frequency fc is sufficiently apart from the vibration frequencies fx, fy, fz of the vibrator elements 34x, 34y, 34z. Thereby, resonances of the vibrator elements 34x, 34y, 34z and the cap 10 are suppressed, unnecessary vibrations are harder to be generated in the vibrator elements 34x, 34y, 34z, and fluctuations of the zero-point outputs are suppressed. Therefore, lowering of the detection accuracy of the electronic device 1 can be effectively suppressed. Further, the resonance frequency fc is adjusted after the assembly of the electronic device 1, and manufacturing variations of the electronic device 1 and individual differences among the angular velocity sensors 3x, 3y, 3z can be easily addressed.

Next, the manufacturing method for the electronic device 1 is explained. As shown in FIG. 11, the manufacturing method for the electronic device 1 includes a housing step S1 of housing the vibrator elements 34 in a housing space formed by the substrate 2 and the cap 10, an inspection step S2 of determining whether to perform an adjustment step S3, the adjustment step S3 of adjusting the resonance frequency of the cap 10 by removing a part of the cap 10, a reinspection step S4 of redetermining whether to perform the adjustment step S3, and a different inspection step S5 of performing a different inspection on the electronic device 1 passing the inspection step S2 or the reinspection step S4. As below, these respective steps S1 to S5 will be explained in detail with reference to the flowchart shown in FIG. 12.

Housing Step S1

The housing step S1 is a step of assembling the electronic device 1. A method of assembling the electronic device 1 is not particularly limited, but, first, the lead group 7 is joined to the substrate 2. Then, the angular velocity sensors 3x, 3y, 3z are mounted on the upper surface 21 of the substrate 2. Then, the electronic component 6 is mounted on the lower surface 22 of the substrate 2. Then, the cap 10 is placed on the substrate 2 to cover the angular velocity sensors 3x, 3y, 3z. Thereby, the angular velocity sensors 3x, 3y, 3z are housed between the substrate 2 and the cap 10. Then, the mold portion 9 is formed to mold the electronic component 6 and join the substrate 2 and the cap 10. Then, the respective leads 71 are bent and shaped. In the above described manner, the electronic device 1 is obtained.

Inspection Step S2

At the inspection step S2, whether the adjustment of the resonance frequency fc of the cap 10 is necessary is inspected. An inspection method is not particularly limited, but includes e.g., the following method. First, the zero-point outputs of the angular velocity sensors 3x, 3y, 3z are measured while the temperature of the electronic device 1 is changed in the operation temperature range, and fluctuations of the zero-point outputs due to temperature changes are detected with respect to each of the angular velocity sensors 3x, 3y, 3z. Then, when the fluctuations of the zero-point output are larger than a predetermined reference value with respect to at least one of three zero-point outputs, for example, when a peak appears in a certain temperature range, it is estimated that the resonance frequency fc is close to the vibration frequencies fx, fy, fz and these resonate and the necessity of the adjustment of the resonance frequency fc is determined. On the other hand, when the fluctuations of the zero-point output are smaller than the predetermined reference value with respect to all three zero-point outputs, it is estimated that the resonance frequency fc is sufficiently apart from the vibration frequencies fx, fy, fz and these do not resonate and the unnecessity of the adjustment of the resonance frequency fc is determined. According to the method, whether the adjustment of the resonance frequency fc is necessary can be simply and accurately determined.

Or, whether the adjustment of the resonance frequency of the cap 10 is necessary may be determined using the following method. It is assumed that, in the electronic device 1, vibration frequency bands Tfx, Tfy, Tfz are set for the respective angular velocity sensors 3x, 3y, 3z. The vibration frequency band Tfx is a frequency band set with reference to the vibration frequency fx of the vibrator element 34x in consideration of the individual difference of the vibrator element 34x. The vibration frequency band Tfy is a frequency band set with reference to the vibration frequency fy of the vibrator element 34y in consideration of the individual difference of the vibrator element 34y. The vibration frequency band Tfz is a frequency band set with reference to the vibration frequency fz of the vibrator element 34z in consideration of the individual difference of the vibrator element 34z. Not particularly limited, but the vibration frequency bands Tfx, Tfy, Tfz are set to about ±0.5% of the vibration frequencies fx, fy, fz, respectively. Further, generally, the vibration frequency bands Tfx, Tfy, Tfz are written on a packaging box, in product specifications of a user manual of the electronic device 1, or the like the above described operation temperature range.

In the method, first, the resonance frequency fc of the cap 10 at a normal temperature is detected using a laser doppler measuring instrument and changes of the resonance frequency fc within the operation temperature range are estimated from a simulation, experimental data, or the like based on the result. Then, the estimation result and the vibration frequencies fx, fy, fx are compared, when differences between the resonance frequency fc and the vibration frequencies fx, fy, fx are smaller than the predetermined reference value, it is estimated that the cap 10 and the vibrator elements 34x, 34y, 34z are highly likely to resonate and the necessity of the adjustment of the resonance frequency fc is determined. On the other hand, when the differences between the resonance frequency fc and the vibration frequencies fx, fy, fx are equal to or larger than the predetermined reference value, it is estimated that the cap 10 and the vibrator elements 34x, 34y, 34z are less likely to resonate and the unnecessity of the adjustment of the resonance frequency fc is determined.

Particularly, using the vibration frequency bands Tfx, Tfy, Tfz as the reference values, when the resonance frequency fc is within the vibration frequency bands Tfx, Tfy, Tfz at least in a temperature zone within the operation temperature range, the necessity of the adjustment of the resonance frequency fc is determined and, when the resonance frequency fc is outside the vibration frequency bands Tfx, Tfy, Tfz in all temperature zones of the operation temperature range, the unnecessity of the adjustment of the resonance frequency fc is determined. According to the method, the reference is clearer and whether the adjustment of the resonance frequency fc is necessary can be easily determined.

At the step S2, when the unnecessity of the adjustment of the resonance frequency fc is determined, the process goes to the different inspection step S5. On the other hand, when the necessity of the adjustment of the resonance frequency fc is determined, the process goes to the adjustment step S3. Thereby, only the electronic device 1 requiring the adjustment of the resonance frequency fc goes to the adjustment step S3 and the number of the electronic devices 1 going to the adjustment step S3 can be reduced. Accordingly, the manufacturing efficiency of the electronic device 1 is increased.

Adjustment Step S3

At the adjustment step S3, a part of the cap 10 is removed and the resonance frequency fc of the cap 10 is shifted toward the lower frequency side so that the resonance frequency fc of the cap 10 may be sufficiently apart from the vibration frequencies fx, fy, fz of the vibrator elements 34x, 34y, 34z. As a method of removing a part of the cap 10 is not particularly limited, but, in the embodiment, laser cutting is used. Thereby, the amount of removal can be controlled with higher accuracy. Accordingly, the resonance frequency fc can be adjusted with higher accuracy. The removed part is not particularly limited, but, in the embodiment, a part of the top part 101a is removed. Thereby, laser can be radiated from above the cap 10 and the removal work is easier. Not limited to that, but a part of the side wall part 101b may be removed in place of or in addition to the top part 101a.

Reinspection Step S4

At the reinspection step S4, whether readjustment of the resonance frequency fc of the cap 10 is necessary is inspected on the electronic device 1 after the adjustment step S3. The inspection method is the same as that of the above described inspection step S2. When the readjustment of the resonance frequency fc is necessary, the number of times of the next adjustment step S3 is determined. Then, when the next adjustment step S3 is at a predetermined number of times N or less, the process goes to the adjustment step S3 again and, when the next adjustment step is at more than the predetermined number N, the electronic device is discarded as a defective product. In this manner, the number of the adjustment steps S3 is limited, and thereby, earlier sorting of the defective product can be realized and the manufacturing efficiency of the electronic device 1 is increased. Further, lowering of the mechanical strength of the cap 10 due to excessive removal can be suppressed. Note that the predetermined number of times N is not particularly limited, but set to five in the embodiment.

Here, the explanation is returned to the adjustment step S3 again. The amount of removal of the cap 10 at one adjustment step S3 may be fixed or different at each time. When the amount of removal is fixed, the amount of removal at one adjustment step S3 may be set to be smaller and the resonance frequency fc of the cap 10 can be gradually adjusted while the adjustment step S3 and the reinspection step S4 are repeated. Accordingly, the man-hour tends to increase, however, the cap 10 is not excessively cut at a time and the resonance frequency fc of the cap 10 can be gradually shifted toward the lower frequency side. Therefore, the resonance frequency fc can be shifted to a position sufficiently apart from the vibration frequencies fx, fy, fx more reliably.

In this case, as shown in FIG. 13, an area Q1 removed at the first adjustment step S3, an area Q2 removed at the second adjustment step S3, an area Q3 removed at the third adjustment step S3, an area Q4 removed at the fourth adjustment step S3, and an area Q5 removed at the fifth adjustment step S3 having the same depth and area with one another may be set in advance and the areas may be removed in the order. Thereby, the number of performed adjustment steps S3 is clearer and can be used for an analysis at a failure or the like.

On the other hand, when the amount of removal of the cap 10 is different at each time, for example, an amount of change Δfc of the resonance frequency fc per unit amount of removal (e.g., 1 μg) is calculated and stored in advance based on a simulation, experimental data, or the like. Then, an amount of adjustment of the resonance frequency fc necessary for shifting of the resonance frequency fc to the position sufficiently apart from the vibration frequencies fx, fy, fx is calculated from an inspection result at the inspection step S2, and further, the amount of removal of the cap 10 corresponding to the calculated amount of adjustment of the resonance frequency fc is calculated. Then, laser cutting is performed to remove the calculated amount of removal from the cap 10. Thereby, an amount suitable for the individual is removed at one adjustment step S3, and the man-hour for the adjustment of the resonance frequency fc can be reduced and the manufacturing efficiency of the electronic device 1 is increased.

In this regard, as shown in FIG. 14, an area corresponding to the amount of adjustment of the resonance frequency fc, i.e., the amount of removal of the cap 10 can be removed. That is, the depth of removal can be fixed and the amount of removal can be controlled by the removed area. Thereby, perforation of the cap 10 by excessively deep cutting and collapse of the air-tightly sealed condition of the cap 10 can be suppressed. On the other hand, as shown in FIG. 15, a thickness corresponding to the amount of adjustment of the resonance frequency fc, i.e., the amount of removal of the cap 10 can be removed. That is, the area of removal can be fixed and the amount of removal can be controlled by the removed depth. Thereby, the cap 10 can be locally cut and lowering of the mechanical strength of the cap 10 can be suppressed.

As above, the manufacturing method for the electronic device 1 is explained. According to the manufacturing method for the electronic device 1, the resonance frequency fc of the cap 10 is adjusted after assembly of the electronic device 1. Accordingly, the amount of adjustment of the resonance frequency fc can be changed with respect to each individual, and manufacturing variations of the electronic device 1 and individual differences among the angular velocity sensors 3x, 3y, 3z can be easily addressed.

As described above, the manufacturing method for the electronic device 1 includes the housing step S1 of housing the vibrator elements 34x, 34y, 34z in the housing space formed by the substrate 2 and the cap 10 as the lid member, and the adjustment step S3 of adjusting the resonance frequency fc of the cap 10 by removing a part of the cap 10. In the method, a part of the cap 10 is removed and the resonance frequency fc of the cap 10 is shifted toward the lower frequency side as necessary after assembly of the electronic device 1, and the resonance frequency fc is sufficiently apart from the vibration frequencies fx, fy, fz of the vibrator elements 34x, 34y, 34z. Thereby, resonances of the vibrator elements 34x, 34y, 34z and the cap 10 are suppressed, unnecessary vibrations are harder to be generated in the vibrator elements 34x, 34y, 34z, and fluctuations of the zero-point outputs are suppressed. Therefore, lowering of the detection accuracy of the electronic device 1 can be effectively suppressed. Further, the resonance frequency fc is adjusted after the assembly of the electronic device 1, and manufacturing variations of the electronic device 1 and individual differences among the angular velocity sensors 3x, 3y, 3z can be easily addressed.

As described above, the manufacturing method for the electronic device 1 further includes the inspection step S2 of determining whether to perform the adjustment step S3.

Thereby, only the electronic device 1 requiring the adjustment of the resonance frequency fc goes to the adjustment step S3 and the number of the electronic devices 1 going to the adjustment step S3 can be reduced. Accordingly, the manufacturing efficiency of the electronic device 1 is increased.

As described above, at the inspection step S2, performing the adjustment step S3 is determined when the resonance frequency fc of the cap 10 is within the vibration frequency bands Tfx, Tfy, Tfz of the vibrator elements 34x, 34y, 34z. According to the method, the reference is clearer and whether the adjustment of the resonance frequency fc is necessary can be easily determined.

As described above, at the adjustment step S3, a part of the cap 10 is removed by laser cutting. Thereby, the amount of removal can be controlled with higher accuracy. Accordingly, the resonance frequency fc can be adjusted with higher accuracy.

As described above, the cap 10 has the top part 101a and the side wall part 101b stood from the outer edge of the top part 101a, and, at the adjustment step S3, a part of the top part 101a is removed by laser cutting.

As described above, at the adjustment step S3, an area corresponding to the amount of adjustment of the resonance frequency fc is removed. Thereby, perforation of the cap 10 by excessively deep cutting and collapse of the air-tightly sealed condition of the cap 10 can be suppressed.

As described above, at the adjustment step S3, a thickness corresponding to the amount of adjustment of the resonance frequency fc can be removed. Thereby, the cap 10 can be locally cut and lowering of the mechanical strength of the cap 10 can be suppressed.

Second Embodiment

Figure 16:
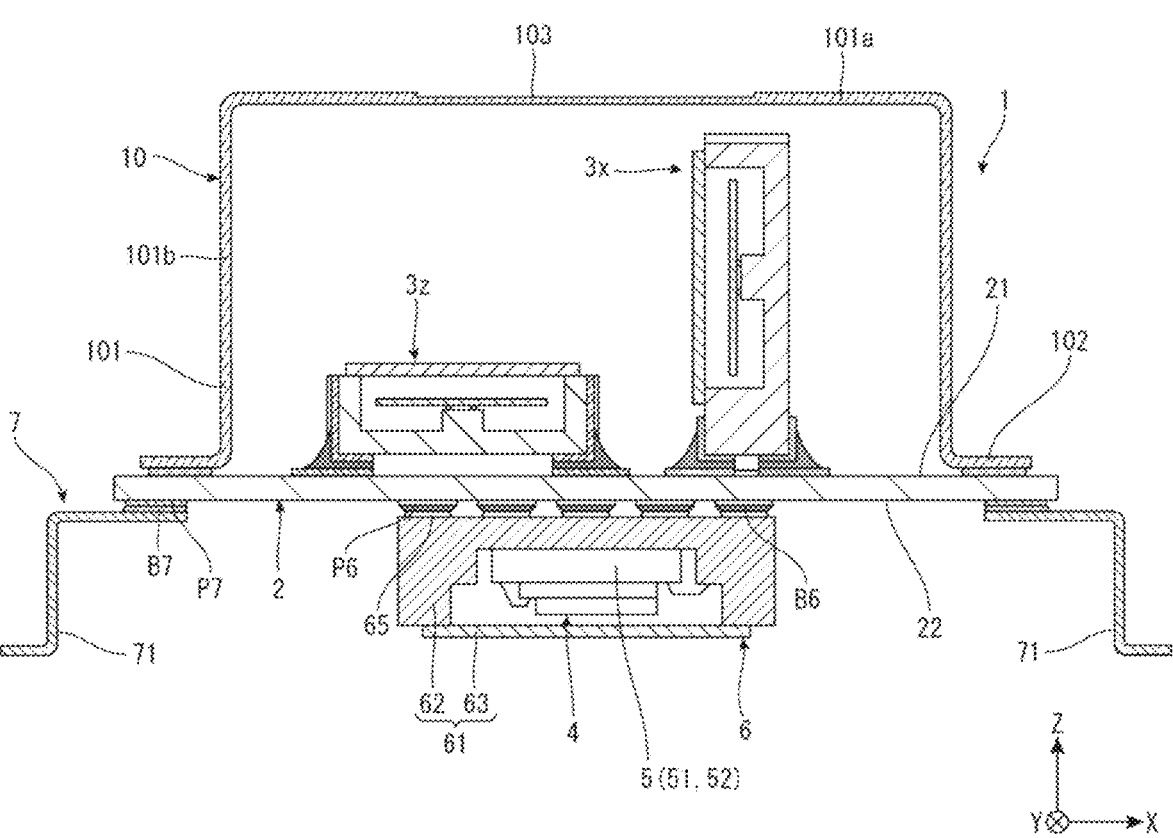
FIG. 16 is a sectional view showing an electronic device according to a second embodiment.

FIG. 16 is a sectional view showing an electronic device according to a second embodiment.

The electronic device 1 of the embodiment is the same as that of the above described first embodiment except that the mold portion 9 is omitted and the configuration of the electronic component 6 is different. Note that, in the following description, the embodiment will be explained with a focus on the differences from the above described embodiment and the explanation of the same items will be omitted. Further, in the drawing of the embodiment, the same configurations as those of the above described embodiment have the same signs.

As shown in FIG. 16, in the electronic device 1 of the embodiment, the mold portion 9 is omitted and the electronic component 6 is exposed compared to the above described first embodiment. Instead, the electronic component 6 is a packaged surface-mounted component and has a package 61 housing the acceleration sensor 4 and the circuit element 5 that are exposed in the above described first embodiment.

The package 61 has a box-shaped base 62 having a recessed portion and a lid 63 joined to the base 62 to close the opening of the recessed portion. The base 62 is formed using a ceramic material such as alumina or titania and the lid 63 is formed using a metal material such as kovar. As described above, the acceleration sensor 4 and the circuit element 5 are housed in the package 61, and thereby, the acceleration sensor 4 and the circuit element 5 are not exposed and these can be protected.

The electronic component 6 is joined to the lower surface 22 of the substrate 2 via conductive joint members B6 on the bottom surface of the package 61. Terminals 65 electrically coupled to the circuit element 5 are formed on the bottom surface of the package 61, and the terminals 65 are electrically coupled to the terminals P6 via the joint members B6.

The cap 10 is joined to the upper surface 21 of the substrate 2 via a joint member in the flange portion 102.

According to the second embodiment, the same effects as those of the above described first embodiment can be exerted.

As above, the manufacturing method for the electronic device and the electronic device of the present disclosure are explained based on the illustrated embodiments, however, the present disclosure is not limited to those. The configurations of the respective parts can be replaced by any configurations having the same functions. Further, any other configuration may be added to the present disclosure. Furthermore, a step for any purpose may be added thereto.

What is claimed is:

1. A manufacturing method for an electronic device comprising:

a housing step of housing an angular velocity sensor in a housing space formed by a substrate and a lid member, the angular velocity sensor having a vibration frequency, the lid member having a plurality of target removal regions, the plurality of target removal regions including a first region and a second region different from the first region, the first region including a center of the lid member in a plan view;

a first inspection step of inspecting whether an initial resonance frequency of the lid member is within a predetermined vibration frequency range including the vibration frequency;

a first adjustment step of adjusting the initial resonance frequency of the lid member by removing a part of the first region of the lid member when the initial resonance frequency of the lid member is within the predetermined vibration frequency range;

a second inspection step of inspecting whether a first post-adjusted resonance frequency of the lid member is within the predetermined vibration frequency range after the part of the first region of the lid member is removed; and a second adjustment step of adjusting the first post-adjusted resonance frequency of the lid member by removing a part of the second region of the lid member when the first post-adjusted resonance frequency of the lid member is within the predetermined vibration frequency range, wherein the angular velocity sensor has a package and a vibrator element housed in the package, the package has a recessed portion and includes a box-shaped base supporting the vibrator element housed in the recessed portion, and a lid joined to the box-shaped base to close an opening of the recessed portion, and the vibrator element includes:

a base portion located in a center part of the vibrator element;

a pair of detection vibration arms extending from the base portion toward first both sides of the vibrator element, respectively;

a pair of supporting arms extending from the base portion toward second both sides of the vibrator element;

a first pair of drive vibration arms extending from an end of one supporting arm of the pair of supporting arms toward the first both sides; and a second pair of drive vibration arms extending from an end of the other supporting arm of the pair of supporting arms toward the first both sides.

2. The manufacturing method for an electronic device according to claim 1, wherein the part of the first region of the lid member is removed by laser cutting.

3. The manufacturing method for an electronic device according to claim 2, wherein the first region of the lid member is located at a top part of the lid member.

4. The manufacturing method for an electronic device according to claim 1, wherein a corresponding area in the plan view of the first region corresponding to an amount of adjustment of the initial resonance frequency of the lid member is removed.

5. The manufacturing method for an electronic device according to claim 1, wherein a corresponding thickness corresponding to an amount of adjustment of the initial resonance frequency of the lid member is removed.

6. An electronic device comprising:

a substrate;

an electronic component mounted on the substrate and including an angular velocity sensor, the angular velocity sensor having a package and a vibrator element housed in the package; and a lid member mounted on the substrate and covering the electronic component, wherein the lid member has a plurality of target removal regions thereon as a frequency adjustment mark formed by removal of a part thereof and being thinner than a surrounding portion, the package has a recessed portion and includes a box-shaped base supporting the vibrator element housed in the recessed portion, and a lid joined to the box-shaped base to close an opening of the recessed portion, and the vibrator element includes:

a base portion located in a center part of the vibrator element;

a pair of detection vibration arms extending from the base portion toward first both sides of the vibrator element, respectively;

a pair of supporting arms extending from the base portion toward second both sides of the vibrator element;

a first pair of drive vibration arms extending from an end of one supporting arm of the pair of supporting arms toward the first both sides; and a second pair of drive vibration arms extending from an end of the other supporting arm of the pair of supporting arms toward the first both sides.

* * * * *